Figure 1:
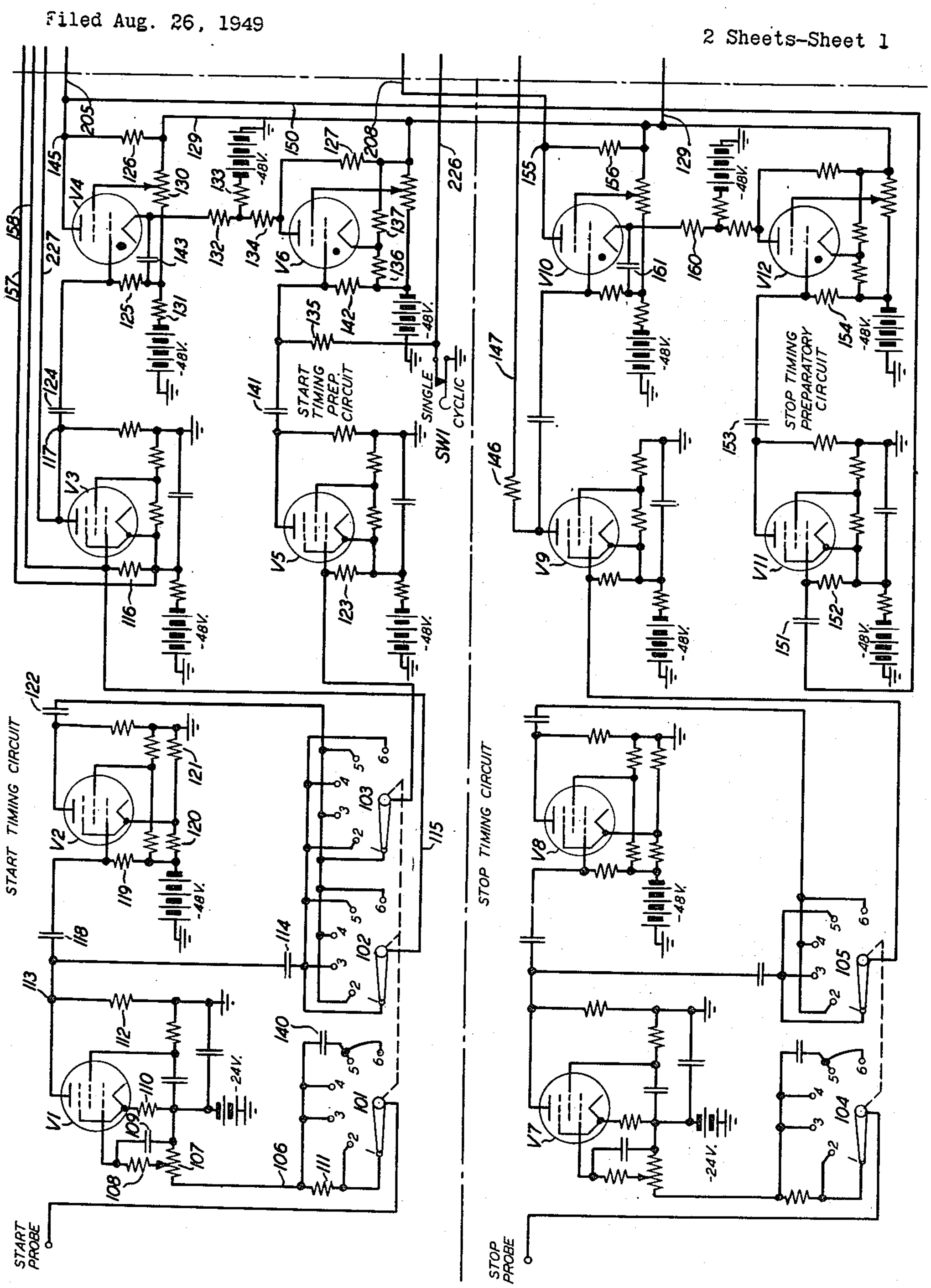

Jan. 11, 1955

H. A. WENK

ELECTRONIC TIMER 2,699,529

Filed Aug. 26, 1949

2 Sheets-Sheet 1

INVENTOR
H. A. WENK
BY J W Schmied
ATTORNEY

Jan. 11, 1955
H. A. WENK
ELECTRONIC TIMER
2,699,529
Filed Aug. 26, 1949
2 Sheets-Sheet 2
FIG. 2
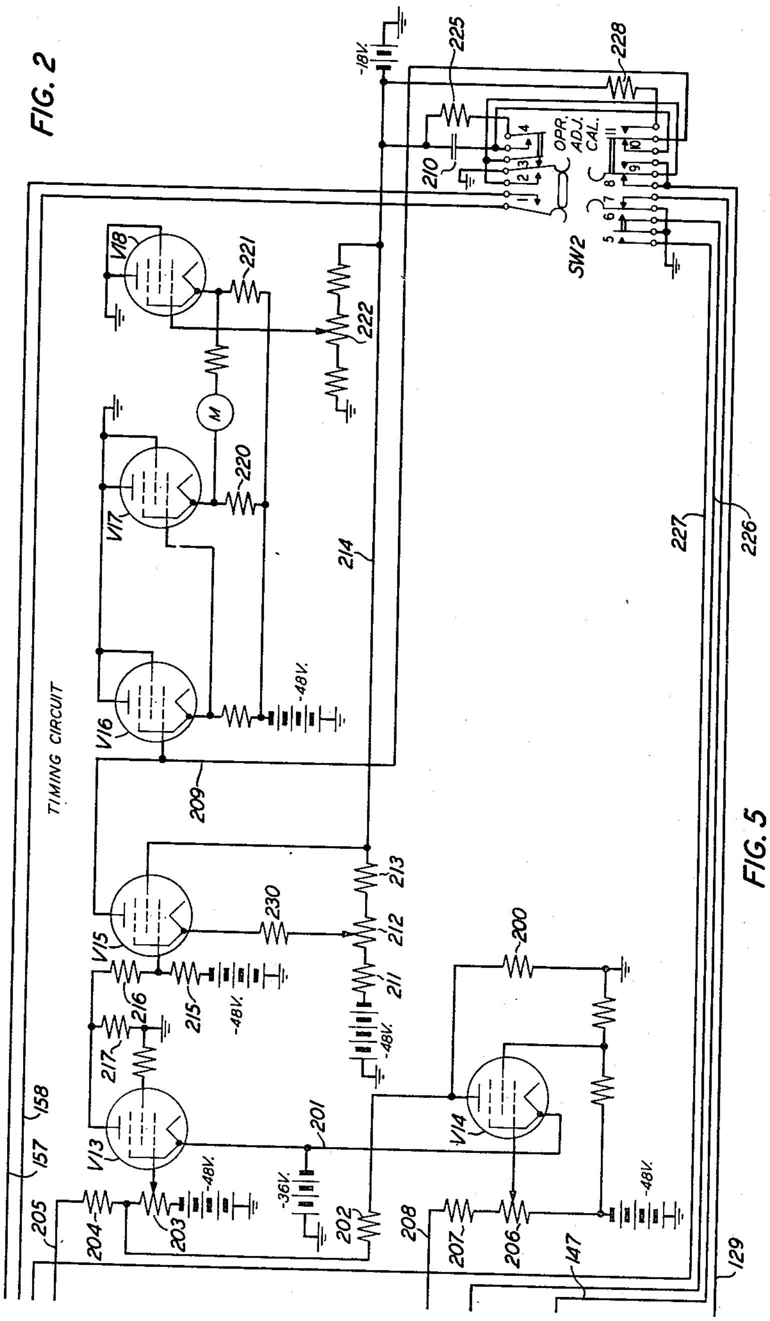
FIG. 4
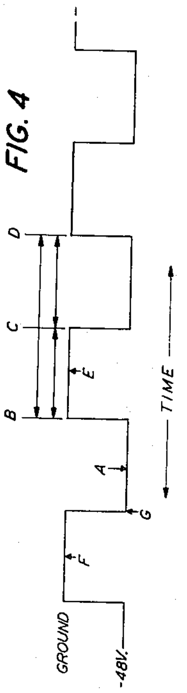
FIG. 5
| POSITION | CHANGE IN CONDITION OF CIRCUIT UNDER TEST |
|---|---|
| 1 | OPEN CIRCUIT TO GROUND |
| 2 | GROUND TO OPEN CIRCUIT |
| 3 | -48V. TO OPEN CIRCUIT |
| 4 | OPEN CIRCUIT TO -48V. |
| 5 | -48V. TO GROUND |
| 6 | GROUND TO -48V. |
FIG. 3
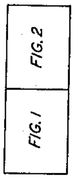
INVENTOR
H. A. WENK
BY J. W. Schmied
ATTORNEY United States Patent Office
2,699,529
Patented Jan. 11, 1955

2,699,529

ELECTRONIC TIMER

Howard A. Wenk, Mountain Lakes, N. J., assignor to Bell Telephone Laboratories, Incorporated, New York, N. Y., a corporation of New York Application August 26, 1949, Serial No. 112,425
5 Claims. (Cl. 324—68)

This invention relates to testing apparatus and more particularly to timing test apparatus.

In many industrial applications, as, for example, in telephone automatic switching systems and automatic accounting systems, certain elements of the apparatus are required to function for relatively precise periods of time, or are required to function at definite intervals subsequent to the operation of other elements. It is desirable and necessary that test equipment be available to ascertain the exactness of the required interval. Such equipment should be capable of measuring any of the time functions of circuit controlling apparatus, such as relays, switches, etc., the time interval between a change in electrical condition of one element and a change in electrical condition of another element, and capable of measuring a single time interval out of a series of repetitive time intervals with minimum possibility of error.

An object of this invention, therefore, is an electronic timer adapted to measure a time interval initiated and terminated by a variety of types of change in electrical condition.

Another object of this invention is an interval timer including means insuring a proper sequential operation of the component circuits thereof.

A further object of this invention is a timer adapted to measure a single interval out of a plurality of repetitive intervals including means for insuring the measurement of a complete interval.

These objects have been accomplished, in general, by the use of separate start and stop circuits provided with high impedance probes. These circuits are settable to be responsive to any of a variety of changes in electrical condition. Means are provided, in the form of a stop timing preparatory circuit, to insure that the stop timing circuit will not function until after the start timing circuit has operated. In order to insure the measurement of a complete single time interval out of a series of repetitive time intervals, means are provided in the form of a start timing preparatory circuit to insure that the start timing circuit will function only at the beginning of the time interval to be measured.

The invention may be more completely understood from the following detailed description with reference to the accompanying drawings, in which Figs. 1 and 2, when arranged in accordance with Fig. 3, show an illustrative embodiment of the invention with the start timing circuit, the start timing preparatory circuit, the stop timing circuit, and the stop timing perparatory circuit being disclosed in Fig. 1 and with the measuring circuit being shown in Fig. 2;

Fig. 4 is a graph demonstrating the method by which one interval is measured out of a plurality of repetitive time intervals; and Fig. 5 is a chart showing the settings of certain control switches in the start timing and stop timing circuits for a variety of possible changes in electrical condition in the circuits under test.

The circuit of the preferred embodiment is adapted to measure time intervals originated and terminated by a plurality of types of changes in electrical condition, and these changes of condition may occur under the control of a plurality of means. For example, in application of the invention in testing telephonic circuits, the device may be employed to measure the operating or release time of a relay or other item of control apparatus which is under the control of the circuit with which it is associated, to measure the interval between the functioning of one element and the functioning of another element in an apparatus, and the measuring of a single time interval of a plurality of repetitive time intervals. As will be discussed in detail hereinafter, each of these time intervals may be initiated and terminated by a variety of types of changes in electrical condtions. For example, the interval may be initiated by a change in electrical condition from open circuit to ground potential, and may be terminated by a change in electrical condition from open circuit to a negative potential.

In general, referring to Fig. 2 of the drawing, the actual timing function is performed by vacuum tube V15, the conduction through which is controlled by gate tube V13 which is normally biased to saturation. Means are provided responsive to a predetermined change in electrical condition to initiate the measurement of the time interval. This means is hereinafter referred to as the start timing circuit and comprises vacuum tubes V1, V2, and V3 and gaseous-discharge tube V4 in Fig. 1. Gaseous-discharge tube V4 is fired at the beginning of the interval to be timed and serves to transmit an effectively negative pulse. This pulse is inverted by gate tube V13 (Fig. 2) to initiate conduction in timing tube V15. Means are also provided responsive to a predetermined change in electrical condition to terminate the measurement of the time interval. This means is herein referred to as the stop timing circuit and comprises vacuum tubes V7, V8 and V9 and gaseous-discharge tube V10. Gaseous-discharge tube V10 is fired at the end of the interval to be timed and serves to transmit an effectively negative pulse. This pulse is applied to the control electrode of normally saturated gate tube V14 (Fig. 2) which responds to this pulse to return gate tube V13 to saturation, thereby biasing timing tube V15 to cut-off. The start timing circuit and the stop timing circuit of Fig. 1 are substantially identical and their operation will be briefly described by reference to the former. Gaseous-discharge tube V4 normally has a negative bias and is fired by applying an effectively positive pulse to the control grid thereof from vacuum tube V3. Since vacuum tube V3 is arranged to invert and amplify a pulse received at its control grid, an effectively negative pulse must be applied thereto. As will be noted hereinafter, if the initiating change in electrical condition in the circuit or apparatus under test is in a positive direction, tube V1 will transmit an effectively negative pulse which may be applied directly to the control grid of vacuum tube V3. If, however, the initiating change in electrical condition is in a negative direction, tube V1 will transmit a posititve pulse which must be inverted before it is applied to the control grid of tube V3. This is accomplished by switching vacuum tube V2 into the circuit.

If a single time interval out of a plurality of cyclically recurring time intervals is to be measured, means are provided for insuring that the start timing circuit will function only at the beginning of one of the intervals. This means is herein called the start timing preparatory circuit and comprises vacuum tube V5 and gaseous-discharge tube V6 in Fig. 1. Switching means are employed to render gas tube V6 non-conductive which serves to disable gas tube V4. The start timing preparatory circuit is then associated by switching means with tube V1 or tube V1 and V2 in order to render that circuit sensitive to a change of electrical condition opposite to that change which is to mark the beginning of the interval to be timed. When that opposite change occurs, tube V5 will receive and invert the signal and transmit a positive pulse to fire gas tube V6. Gas tube V6, in firing, enables gas tube V4 so that upon the proper change in electrical condition in the external circuit, tube V4 may be fired to initiate the timing.

The stop timing circuit operates in a manner substantially identical with that of the start timing circuit. A stop timing preparatory circuit is provided which affects the stop timing circuit in a manner similar to that in which the start timing preparatory circuit affects the start timing circuit, except that the stop timing preparatory circuit is operative under all types of measurement and receives its operating signal when gas tube V4 in the start timing circuit is rendered conductive. By this means it is assured that the stop timing and start timing circuits will operate in the proper sequence. By using gaseous-discharge tubes to control the timing circuit, after the test set has measured one time interval in a recurring signal, subsequent signals will be ignored.

Now considering the circuits of the preferred embodiment in greater detail, switch SW2 in Fig. 2 is first moved into the operate position labeled OPR, as shown. Referring now to Fig. 1, high impedance leads are provided for connection to the point or points under test at which the change of condition is to mark the initiation and termination of the time intervals, and these leads are termed, respectively, the start probe and the stop probe as shown in Fig. 1 of the drawing. The start and stop probes are connected to the rotor contact of one bank of a multiterminal switch such as banks 101 and 104, respectively. Banks 101, 102 and 103 of the multiposition switch associated with the start timing circuit are ganged as are banks 104 and 105 of the switch associated with the stop timing circuit. By means of switch bank 101, the start probe is connected via conductor 106 to the control grid of vacuum tube V1, this circuit including voltage divider 107 which is connected to the minus 24-volt cathode supply. Voltage divider 107 thereby serves as a means for adjusting the magnitude of the signal applied to the control grid of tube V1. The network comprising resistor 108 and capacitor 109 may also be included in the control grid circuit to filter any high frequency signals which might be picked up by the start probe. The cathode of vacuum tube V1 is connected through resistor 110 to a source of cathode voltage which is preferably of approximately negative 24 volts. This value is selected with a consideration of a maximum voltage normally encountered by the start probe, which in telephone switching systems, is frequently negative 48 volts, and is selected to permit tube V1 to produce either positive or negative output signals as will be discussed hereinafter. Tube V1, as well as the other vacuum tubes in the disclosed circuit, is preferably a pentode, and, for the exemplary application to telephone switching circuits, is preferably of the low voltage type, such as type 6AJ5, for example.

Prior to the measurement of the time interval, these switches are set in position in accordance with the type of change of electrical condition which will occur to mark the initiation and termination of the interval in accordance with the chart of Fig. 5 as will be discussed hereinafter. In that chart and throughout the several figures of the drawing, the main battery supply has been assumed to be negative 48 volts in accordance with typical telephone usage, although the circuits may be readily modified by one skilled in the art to permit the use of a voltage supply of different value or polarity. Accordingly, throughout this specification, a pulse transmitted as a result of a sudden increase in potential will be labeled a "positive" pulse and a pulse transmitted as a result of a sudden decrease in potential will be labeled a "negative" pulse even though all potentials will actually be negative under the assumed conditions.

Referring now to the start timing circuit of Fig. 1, let it be assumed that the start probe is connected to a conductor or to a relay contact which at the moment has no potential applied thereto, i. e., is at open circuit, and which subsequently upon the functioning of the apparatus under test will become grounded. As indicated in Fig. 5, the switch comprising banks 101, 102 and 103 will therefore be set in the No. 1 position as is shown in Fig. 1. With bank 101 in its No. 1 position, the start probe is connected to conductor 106 through high impedance resistor 111 which serves to prevent the test set from interacting with the circuit under observation. Under the assumed initial condition, no potential is applied to the control grid of tube V1 via the start probe, at this time, and the tube therefore is subjected to a normal bias by the cathode resistor 110 under which the tube will be conductive.

When the external circuit undergoes the expected change in electrical condition, ground potential, as modified by voltage divider 107 and resistor 111, is applied to the control grid of tube V1. Tube V1 thereby undergoes an increase in conduction which results in an increased potential drop across plate resistor 112 which, in turn, results in a lowering of the potential (more negative potential) at point 113. Thus, the initiating change in electrical condition is amplified and inverted by vacuum tube V1 whereby, in effect, a negative signal appears at point 113.

Since switch bank 102 of the multiposition switch in the start timing circuit has been assumed to be in its No. 1 position, the signal at point 113 is transmitted via capacitor 114, No. 1 contact of switch bank 102, conductor 115 and to the grid of vacuum tube V3, the signal being differentiated by the network comprising capacitor 114 and resistor 116. Vacuum tube V3 is biased to saturation which may be accomplished, with the preferred type of vacuum tube, with a zero bias as shown in Fig. 1. The receipt of the negative pulse at the control grid of tube V3 will therefore cause a rise in voltage at point 117 in a manner similar to that described in reference to tube V1. Thus, tube V3 inverts and amplifies the signal and transmits a relatively positive (less negative) pulse.

It may be noted that the signal at point 113 is also differentiated by capacitor 118 and resistor 119 and applied to the control grid of vacuum tube V2. By means of the voltage divider comprising resistors 120 and 121, pentode V2 is preferably biased below saturation, as, for example, by applying a negative 4-volt grid bias for the preferred type of tube. Therefore, the signal will be inverted and amplified whereby a relatively positive pulse will be produced. Since switch bank 103 is in its No. 1 position, this pulse will be differentiated by capacitor 122 and resistor 123 and applied to the control grid of vacuum tube V5. However, pentode V5 is biased to saturation in a manner identical to that of tube V3, and therefore the application of a relatively positive signal to the control grid of tube V5 will be ineffective to modify the present condition of that tube. Therefore, the circuit including tubes V2 and V5 is not utilized in the cases where the signal applied to the control grid of tube V1 results from a change in the positive direction except in the measuring of one interval out of a plurality of repetitive intervals as will be discussed hereinafter.

The relatively positive signal at point 117 is differentiated by capacitor 124 and resistor 125 and applied to the control grid of tube V4. Tube V4, as well as tubes V6, V10, and V12 are gaseous-discharge tetrodes such as type 2D21 and are biased so as normally to be non-conducting. Ground potential is supplied over a path through the closed No. 3 and No. 8 contacts of switch SW2 (Fig. 2), conductor 129, resistor 126, and to the anode of gas tube V4. Conductor 129 is also connected to negative 48-volt battery through resistors 130 and 131 and the control grid of tube V4 is tapped between those resistors so that a divided bias voltage is applied to that grid. The cathode of tube V4 is connected to negative battery through resistors 132 and 133, and is also connected through resistor 134 to the anode of tube V6 which is connected to the ground potential on conductor 129 through resistor 127. The value of the resistors 133 and 134 is adjusted so that tube V4 is normally disabled and will not be discharged by the application of a signal to its control grid. However, in the measurement of single time intervals, switch SW1 is in the "single" position, as shown, whereby ground potential is applied to the control grid of gas tube V6 through resistor 135. Tube V6, which is normally biased to cut-off by means of the voltage divider comprising resistors 136 and 137, is thereby discharged. The potential drop across plate resistor 127 as the result of current flow through the plate circuit of tube V6 lowers the potential (more negative potential) of the anode of tube V6 to enable gas tube V4 by reducing its cathode potential so that upon the receipt of the signal transmitted by tube V3, tube V4 will be discharged. This discharge in tube V4 controls the commencement of the measurement of the time interval. It may be noted that upon the discharge occurring in tube V4, the control grid thereof loses control so that any subsequently received start pulse is ineffective to modify the condition of tube V4 at this time.

Referring again to the chart of Fig. 5, it will be noted that in the Nos. 1, 3 and 5 positions of the start timing circuit and stop timing circuit switches, the change in electrical condition in the circuit under test may be considered to be in a positive direction, while in the Nos. 2, 4, and 6 positions the expected change of electrical condition is in a negative direction. As in the above description where the switches were assumed to be set in the No. 1 position, when the change of electrical condition is in a positive direction tube V1 transmits an effectively negative pulse which may be applied directly to the control grid of tube V3. However, if the expected change in electrical condition is in a negative direction, tube V1 transmits, in effect, a positive pulse which must be inverted by tube V2 in order that a negative pulse may be applied to the control grid of saturated tube V3. Therefore, considering only the start timing circuit, the switch banks 101, 102 and 103 are set in either the No. 2, No. 4 or No. 6 position in accordance with the particular change expected. As will be seen in Fig. 1, the result is the same whether the banks 102 and 103 be in the No. 2, No. 4 or No. 6 position. In either case tube V2 is connected into the start timing circuit so that the positive signal transmitted by tube V1 will be inverted and amplified by tube V2 and applied, through switch bank 102 and via conductor 115, to the control grid of tube V3. It may be noted that with switch bank 103 in the No. 2, 4 or 6 position, the positive signal transmitted by tube V1 is applied to the control grid of saturated tube V5, but is ineffective to modify the condition thereof. Switch bank 101 serves to establish a direct connection from the start probe to conductor 106 in positions No. 3 and No. 4 in which the expected electrical conditions are negative 48 volts and open circuit, inserts the high impedance 111 into the start probe circuit in positions No. 1 and No. 2 in which the expected electrical conditions are open circuit and ground, and inserts capacitor 140 into the start probe circuit in positions No. 5 and No. 6 in which the expected electrical conditions are negative 48 volts and ground.

In the measurement of an individual time interval, the start preparatory circuit serves no necessary function, but is utilized in measuring one interval out of a plurality of repetitive time intervals. Thus, referring to the representation of Fig. 4, let it be assumed that a point in the circuit under test is regularly alternating between negative 48 volts and ground. Let it further be assumed that it is desired to measure the length of time during which the point is at ground potential, i. e., time B–C, or the length of a full "cycle," i. e., time B–D. In either case, the change in electrical condition which will mark the initiation of the interval to be timed is a change from negative 48 volts to ground potential as at point B. The start timing circuit switches are therefore moved to the No. 5 position as per Fig. 5. If, with the circuit in operative condition, the start probe is connected to the point under test at time A (Fig. 4), timing will be initiated properly at point B upon the change to ground potential. However, let it be assumed that the start probe contacts the point under test as time E. At the instant of contact, ground potential will be applied to the grid of tube V1 and timing will be initiated whereby the interval timed will be E–C or E–D rather than interval B–C or B–D as desired, and an inaccurate result will be obtained. To eliminate this possibility of error, a start timing preparatory circuit is provided. In general, this circuit serves to disable the start timing circuit until the start timing preparatory circuit has been operated by a change in electrical condition in the external circuit opposite to that which is to mark the beginning of the interval to be timed.

As hereinbefore discussed, gaseous-discharge tube V4 in the start timing circuit is associated with gaseous-discharge tube V6 in such a fashion that the former is disabled until the latter is fired. In the measurement of single time intervals, tube V6 was fired by the placing of switch SW1 in the "single" position to ground the control grid of tube V6. In measuring one interval out of a plurality of time intervals, switch SW1 is moved to the "cyclic" position whereby the control grid of tube V6 is not grounded and the tube remains non-conductive, disabling tube V4. The switches of the start timing circuit are so arranged that tube V2 is placed either in circuit with tube V3 or in circuit with tube V5 so that any signal transmitted by tube V1 causes, in effect, pulses of opposite polarity to be applied to the control grids of tubes V3 and V5. Since both of these tubes are at saturation, only the one to which an effectively negative pulse is applied will undergo any change in condition.

As a specific example, let it be assumed that it is desired to measure the interval from B–C or B–D in Fig. 4. Since the interval is to be initiated by a change of electrical condition from negative 48 volts to ground, the start timing circuit banks 101, 102, and 103 are set in the No. 5 position. Let it be assumed that the start probe is connected to the test point in the external circuit at point of time F (Fig. 4). At time F the external circuit is at ground potential so that an effectively positive pulse is transmitted through capacitor 140 to the grid of tube V1 and that tube then transmits a negative signal as hereinbefore described. This negative signal is applied through the contacts at the No. 5 position of switch bank 102 to tube V3 which inverts the signal, thereby applying a positive signal to the control grid of tube V4. Tube V4, however, is disabled at this time as previously described and will therefore not be discharged at the receipt of this pulse. Simultaneously, the negative pulse transmitted by tube V1 is inverted by tube V2, and transmitted through the contacts at the No. 5 position of switch bank 103 to the control grid of tube V5. Since this tube is at saturation, the application of a positive pulse in the control grid thereof will be ineffective.

At the change of electrical condition in the external circuit from ground potential to negative 48 volts at time G (Fig. 4) an effectively negative pulse will be applied to the grid of tube V1 and therefore that tube will transmit an effectively positive signal. This signal will be applied through switch bank 102 to the grid of saturated tube V3 and is there blocked. The positive signal from tube V1 will also be inverted by tube V2 and applied as a negative pulse through switch bank 103 to the control grid of saturated tube V5. The circuit of tube V5 is similar to that of tube V3 and, in a fashion similar to that previously described, tube V5 will invert and amplify the received pulse. The resulting positive pulse is differentiated by capacitor 141 and resistor 142 and is applied to the control grid of gaseous-discharge tube V6, as a result of which tube V6 will undergo a discharge. Tube V6, in discharging, reduces the potential at the cathode of tube V4 thereby enabling gaseous-discharge tube V4. Therefore at time B (Fig. 4) when the potential of the external circuit again changes to ground, tube V1 again transmits a negative pulse which is inverted by tube V3 and transmitted to discharge tube V4 to initiate timing. Tube V4, being a gaseous-discharge tube, will not be affected by subsequent signals.

In a similar fashion, if the change of electrical condition in the circuit under test which is to mark the beginning of the interval to be timed is in a negative direction, the switch banks 101, 102, and 103 are set in the No. 2, 4 or 6 positions which serves to associate the pulse-inverting tube V2 with tube V3 and causes tube V5 to be associated directly with tube V1. Under this arrangement, upon a change of electrical condition of the external circuit in a positive direction, gas tube V6 is discharged to enable gas tube V4, and tube V4 may then be fired on the next change in electrical condition of the circuit under test in a negative direction.

It may be noted that resistor 132 and capacitor 143 comprise a time-delay circuit to prevent the start timing circuit from responding to transients arising, for example, from relay chatter on the signal which actuates the start timing preparatory circuit.

The stop timing circuit is substantially identical to the start timing circuit except in the manner of its association with its preparatory circuit and except that tube V9 therein is supplied with plate voltage over a path including resistor 146, conductor 147, No. 7 contact of switch SW2, and to ground, for a purpose hereinafter to be described. The stop timing preparatory circuit, unlike the start timing preparatory circuit, functions in each type of measurement and must operate before the stop timing circuit can function. The stop timing preparatory circuit is substantially identical to the start timing preparatory circuit except that its operating pulses are received from the start timing circuit. The stop timing preparatory circuit is not operated to enable the stop timing circuit until tube V4 in the start timing circuit is discharged, and the stop timing preparatory circuit therefore serves to prevent the operation of the stop timing circuit prior to the operation of the start timing circuit. Thus proper sequential operation is assured. When gaseous-discharge tube V12 is not conducting, gas tube V10 is disabled by virtue of the resulting high negative grid-cathode bias. When gas tube V4 is discharged to initiate the measurement of the time interval, the potential at point 145 in its plate circuit drops. This effectively negative signal is transmitted by conductor 150, differentiated by capacitor 151 and resistor 152, and applied to the control grid of normally saturated vacuum tube V11. Tube V11 inverts and amplifies the signal, transmitting an effectively positive pulse which is differentiated by capacitor 153 and resistor 154 and applied to the control grid of gas tube V12. The discharge of gas tube V12 lowers the potential at the anode thereof which lowers the potential at the cathode of gas tube V10, thereby enabling gas tube V10 and rendering the stop timing circuit operative. Upon the next succeeding change in electrical condition in the circuit under test for which the stop timing circuit has been set, tubes V7 and V9, or tubes V7, V8 and V9, depending upon the effective polarity of the signal at the stop probe, will transmit pulses to discharge gas tube V10. In other words, switch bank 105 is set to insert or bypass the stage comprising vacuum tube V8 as required so that the desired stop signal will always appear as a positive pulse at the grid of the stop circuit gas tube V10. The discharge of gas tube V10 results in the lowering of the anode potential thereof which serves to cause the termination of the measurement of the time interval as will be seen hereinafter. Tube V10, being a gaseous-discharge tube, will not be affected by subsequent signals. It may be noted that resistor 160 and capacitor 161 comprise a time-delay circuit to prevent the stop timing circuit from responding to transients arising, for example, from relay chatter on the signal which actuates the start timing circuit.

Referring now to Fig. 2, in general, two normally conducting gate tubes V13 and V14 are provided. Gate tube V13, when conducting, causes timing tube V15 to be biased to cut-off. At the receipt of the start signal from the start timing circuit, tube V13 is cut off, rendering timing tube V15 conductive to charge a capacitor in its plate circuit. At the receipt of the stop signal from the stop timing circuit, gate tube V14 is cut off. The rise in plate potential of tube V14 applies a positive voltage to the grid of tube V13 making tube V13 again conductive which cuts off timing tube V15, thereby terminating the measurement of the interval. The charge on the capacitor is measured by means of a vacuum tube voltmeter circuit, with the resulting change being readable in units of time.

Considering now the circuits of the gate tubes V13 and V14, the anodes of tubes V13 and V14 are below ground potential due to the voltage drops across load resistors 217 and 200, respectively. The cathodes of tubes V13 and V14 are connected to a common negative 36-volt battery by conductor 201. The control grid of gate tube V13 is connected to a voltage divider circuit comprising negative 48-volt battery, resistors 203 and 204, conductor 205, point 145, resistor 126, and to ground on conductor 129. A parallel circuit comprising resistors 202 and 200 connects resistor 203 to ground. The parameters of the circuits are so selected that with the start circuit gas tube V4 extinguished, tube V13 has a positive grid-cathode bias and is conducting. Similarly, the control grid of gate tube V14 is connected to a voltage divider circuit comprising negative 48-volt battery, resistors 206 and 207, conductor 208, point 155, resistor 156, and to ground on conductor 129. Thus, with the stop circuit gas tube V10 extinguished, tube V14 has a positive grid-cathode bias and is conducting.

It may be noted that with tube V14 conducting, the plate potential thereof becomes more negative due to the potential drop across resistor 200 and, therefore, due to the voltage divider circuit comprising resistor 202, resistor 203 and negative 48-volt battery, the grid of tube V13 becomes more negative. However, the grid-cathode bias of tube V13 remains sufficient to maintain conduction in tube V13 while gas tube V4 is non-conductive.

When the proper start signal is received, the start timing circuit gas tube V4 is discharged as above described. As a result of conduction through tube V4 the potential at point 145 is lowered due to the potential drop across resistor 126 which reduces the potential applied to the control grid of gate tube V13, cutting that tube off. When, subsequently, the proper stop signal is received, the stop timing circuit gas tube V10 is discharged as above described. As a result of conduction through tube V10, the potential at point 155 is lowered due to the potential drop across resistor 156 which reduces the potential applied to the control grid of gate tube V14, cutting that tube off. When tube V14 is cut off, the plate thereof rises in potential. The grid potential of tube V13 therefore rises and conduction again occurs in tube V13. Thus, gate tube V13 is normally conducting, is cut off at the beginning of the interval to be measured, and is again rendered conductive at the end of the interval to be measured. It may be noted that by varying the taps from the control grids of gate tubes V13 and V14 on the voltage divider resistors 203 and 206, respectively, the static grid potential of these tubes may be adjusted so that the plate potential of tube V13 after the receipt of the stop signal is the same as before the receipt of the start signal.

The variation of plate potential of tube V13 is employed to control the conduction of the timing vacuum tube V15. Tube V15 is preferably a pentode. The anode of tube V15 is connected via conductor 209, No. 10 contacts of switch SW2, timing capacitor 210 to negative 18-volt battery. The cathode of vacuum tube V15 is tapped to the voltage divider circuit comprising negative 48-volt battery, resistors 211, 212, and 213, conductor 214, and negative 18-volt battery. The control grid of tube V15 is tapped to the voltage divider circuit comprising negative 48-volt battery, resistors 215, 216 and 217 and ground, the resistor 217 and ground also comprising the plate circuit of gate tube V13. The parameters of the circuits are arranged so that when tube V13 is conducting, so that its plate voltage is depressed as a result of the potential drop across resistor 217, tube V15 is biased to cut-off, but when tube V13 is cut-off, the consequent rise of plate voltage thereof is sufficient to render timing tube V15 conductive. Therefore tube V15 conducts throughout the interval to be measured and timing capacitor 210 charges throughout this same period. The characteristics of a pentode are such that capacitor 210 will charge at a substantially constant rate, but timing tube V15 may be provided with feedback to insure a higher degree of linearity of charging if desired such as by the addition of resistor 230. It may be noted that the rate of charging of capacitor 210 may be controlled by adjusting the tap from the cathode of timing tube V15 on voltage-divider resistor 212.

The charge of the timing capacitor 210 may be measured in any well-known fashion. In the preferred embodiment, a conventional vacuum tube voltmeter is provided comprising pentodes V17 and V18 with a sensitive direct-current meter M connected between cathode resistors 220 and 221. The voltage to be measured is applied to the control grid of tube V17, and a zero reading is obtained with no voltage on capacitor 210 by adjusting the control-grid voltage of tube V18 by means of the adjustable voltage divider resistor 222. As shown in the preferred embodiment, decay of the charge on capacitor 210 may be minimized by inserting an isolating circuit, comprising a vacuum tube V16 between the vacuum tube voltmeter and the timing condenser, with tube V17 being arranged to follow the variations of cathode potential of isolating tube V16.

Referring now to key switch SW2 in Fig. 2, the operate, adjust and calibrate positions of that switch are labeled OPR, ADJ, and CAL, respectively. In the preceding discussion, switch SW2 has been assumed to be in the operate position. When this switch is placed in the adjust position, the No. 4 contacts of that switch are closed to place resistor 225 in shunt of the timing capacitance 210, and the No. 1 contacts of that switch are closed to interconnect conductors 157 and 158 to shunt the grid resistor 116 of tube V3. The shunting of resistor 116 renders the start timing circuit insensitive to received signals whereby timing tube V15 is not conductive, and the shunting of the timing capacitor assures zero capacitor voltage so that accurate adjustment of the zero reading of the meter M may be obtained. Operation of key switch SW2 to the calibrate position CAL connects ground through the No. 6 contacts of that switch, conductor 226, resistor 135, and to the control grid of tube V6 whereby tube V6 is discharged to enable the start timing gas tube V4. Upon the operation of the switch SW2 to the calibrate position, ground is also conducted through the No. 5 contacts of that switch, conductor 227 and to the anode of tube V3. Since this tube is substantially at saturation, having zero bias, the application of ground to the anode of tube V3 raises the potential at point 117 which causes an effective positive pulse to be applied to the control grid of gas tube V4, causing that tube to discharge as hereinbefore described. The operation of switch SW2 to the calibrate position also opens the No. 7 contacts thereof to interrupt the plate voltage supply of tube V9. Thus, the reception of the start signal is simulated and the stop timing circuit is disabled. The opening of the No. 10 contact of switch SW2 removes timing capacitor 210 from the plate circuit of timing tube V15, and the closing of the No. 11 contacts of switch SW2 places calibrating resistor 228 in that plate circuit. The cathode bias of tube V15 may then be adjusted as above described to regulate the charging current for a full scale meter reading.

It may be noted that after the measurement of the time interval, the circuits may be restored in preparation for further measuring by momentarily placing key switch SW2 in the adjust position. This momentarily opens the plate supply leads to the gaseous-discharge tubes, permitting them to deionize, and discharges the charging capacitor 210 through the resistor 225.

It is to be understood that the tube types and the voltage values are purely exemplary. It is to be further understood that the above-described arrangements are illustrative of the application of the principles of the invention. Numerous other arrangements may be devised by those skilled in the art without departing from the spirit and scope of the invention.

What is claimed is:

1. In a time measuring device for use in measuring the time characteristics of a circuit under test undergoing repetitive changes between a first and a second electrical condition, a first electron discharge device, means connected to the circuit under test and to said first device for applying a signal indicative of said first electrical condition to said first device, means connected to said first device for normally disabling said first device, means including said last-mentioned means responsive to said second electrical condition for enabling said first device to respond to the signal applied thereto, a second electron discharge device, means connected to the circuit under test and to said second device for applying a signal indicative of a preselected one of said electrical conditions to said second device, means connected to said second device for normally disabling said second device and operative under the control of said first device to enable said second device to respond to the signal appled thereto, and means controlled by said first and said second devices for measuring time.

2. In a time measuring device for use in measuring the time characteristics of a circuit under test undergoing repetitive changes between a first and a second electrical condition, a first normally non-conductive electron discharge device, means connected to the circuit under test and to said first device for applying a signal indicative of said first electrical condition to said first device, means connected to said first device for normally disabling said first device to become conductive, means including said last-mentioned means responsive to said second electrical condition for enabling said first device to become conductive in response to the signal applied thereto, a second normally non-conductive electron discharge device, means connected to the circuit under test and to said second device for applying a signal indicative of a preselected one of said electrical conditions to said second device, means connected to said second device for normally disabling said second device to become conductive and operative under the control of said first device to enable said second device to become conductive in response to the signal applied thereto, and means controlled by said first and said second devices for measuring time.

3. In a time measuring device for use in measuring the time characteristics of a circuit under test undergoing repetitive changes between a first and a second electrical condition, a first electron discharge device, means connected to the circuit under test and to said first device for applying a signal indicative of said first electrical condition to said first device, means comprising a second electron discharge device connected to said first device for normally disabling said first device, means including said last-mentioned means responsive to said second electrical condition for enabling said first device to respond to the signal applied thereto, a third electron discharge device, means connected to the circuit under test and to said third device for applying a signal indicative of a preselected one of said electrical conditions to said third device, means comprising an electron discharge device for normally disabling said third device and operative under the control of said first device to enable said third device to respond to the signal applied thereto, and means controlled by said first and said third devices for measuring time.

4. In a time measuring device for use in measuring the time characteristics of a circuit under test undergoing repetitive changes between a first and a second electrical condition, a first normally non-conductive electron discharge device, means connected to the circuit under test and to said first device for applying a signal indicative of said first electrical condition to said first device, means comprising a second electron discharge device connected to said first device for normally disabling said first device to become conductive, means including said last-mentioned means responsive to said second electrical condition for enabling said first device to become conductive in response to the signal applied thereto, a third normally non-conductive electron discharge device, means connected to the circuit under test and to said third device for applying a signal indicative of a preselected one of said electrical conditions to said third device, means comprising a normally non-conductive electron discharge device connected to said third device for normally disabling said third device to become conductive and operative under the control of said first device to enable said third device to become conductive in response to the signal applied thereto, and means controlled by said first and said third devices for measuring time.

5. In a time measuring device for use in measuring the time characteristics of a circuit under test undergoing repetitive changes between a first and a second electrical condition, a first normally non-conductive electron discharge device having a cathode, means for applying to said first device a signal indicative of the transition of the circuit under test from said first to said second electrical condition, a second normally non-conductive electron discharge device having an anode, means for applying to said second device a signal indicative of the transition of the circuit under test from said second to said first electrical condition for rendering said second device conductive, means connecting the anode of said second device to the cathode of said first device for disabling said device when said second device is non-conductive and for enabling said first device when said second device is conductive, a third normally non-conductive electron discharge device having a cathode, means for applying to said third device a signal indicative of the transition of the circuit under test from one to the other of its electrical conditions, a fourth normally non-conductive electron discharge device having an anode, means controlled by said first device for rendering said fourth device conductive, means connecting the anode of said fourth device to the cathode of said third device for disabling said third device when said fourth device is non-conductive and for enabling said third device when said fourth device is conductive, and means controlled by said first and said third devices for measuring time.

References Cited in the file of this patent

UNITED STATES PATENTS

| | | |
|---|---|---|
| 2,021,766 | Bivens | Nov. 19, 1935 |
| 2,301,195 | Bradford | Nov. 10, 1942 |
| 2,370,692 | Shepherd | Mar. 6, 1945 |
| 2,402,916 | Schroeder | June 25, 1946 |
| 2,412,631 | Rice | Dec. 17, 1946 |
| 2,421,018 | De Rosa | May 27, 1947 |
| 2,442,403 | Flory et al. | June 1, 1948 |
| 2,514,369 | Buehler | July 11, 1950 |
| 2,575,759 | Higinbotham | Nov. 20, 1951 |